United States Patent
Lee

(10) Patent No.: US 8,330,719 B2
(45) Date of Patent: Dec. 11, 2012

(54) MOUSE

(75) Inventor: Tsung-Shih Lee, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 457 days.

(21) Appl. No.: 12/624,627

(22) Filed: Nov. 24, 2009

(65) Prior Publication Data

US 2011/0122065 A1     May 26, 2011

(51) Int. Cl.
*G06F 3/033* (2006.01)
(52) U.S. Cl. .................. 345/163; 345/157; 345/164
(58) Field of Classification Search .................. None
See application file for complete search history.

(56) References Cited

U.S. PATENT DOCUMENTS

| | | | |
|---|---|---|---|
| 6,175,360 B1* | 1/2001 | Bidiville et al. | 345/164 |
| 6,184,870 B1* | 2/2001 | Bidiville et al. | 345/164 |
| 6,222,525 B1* | 4/2001 | Armstrong | 345/161 |
| 6,459,421 B1* | 10/2002 | Cho et al. | 345/166 |
| 6,749,158 B2* | 6/2004 | Timm | 248/118 |
| 7,075,526 B2* | 7/2006 | O'Keeffe et al. | 345/184 |
| 7,295,185 B2* | 11/2007 | Wang | 345/164 |
| 7,616,188 B1* | 11/2009 | Blandin et al. | 345/163 |
| 7,733,328 B2* | 6/2010 | Blandin et al. | 345/163 |
| 2007/0146324 A1* | 6/2007 | Blandin et al. | 345/163 |
| 2008/0068338 A1* | 3/2008 | Huang et al. | 345/164 |

* cited by examiner

*Primary Examiner* — Adam R Giesy
(74) *Attorney, Agent, or Firm* — WPAT, P.C.; Anthony King

(57) ABSTRACT

A mouse includes a bottom casing, a PCB with a controller fixed thereon and a roller unit assembled to the bottom casing, and a top casing coupled with the bottom casing. The bottom casing has a retainer plate and a backing plate in rear of the retainer plate. The retainer plate and the backing plate respectively define a location hole and a receiving recess thereon. The PCB defines an opening in front of the controller and a slit positioned between the controller and the opening. The backing plate passes through the slit while the retainer plate locates in front of the opening. The roller unit includes a roller bearing which has a location post extended forward from a front thereof to be inserted into the location hole, and a contact post extended rearward from a rear thereof to be received in the receiving recess so as to movably activate the controller.

6 Claims, 4 Drawing Sheets

MOUSE

BACKGROUND OF THE INVENTION

1. Field of the Invention

The present invention relates to an input device, and more particularly to a mouse.

2. The Related Art

As is known to all, mouse is a very popular computer input device, it allows a user to move an input pointer (e.g., cursor) and to make selections with respect to a graphical user interface (GUI). With the rapid development of computer, the mouse will not be limited to the current operating functions. Mouse in the future will have multiple functions such as switch function, multi-button function, and the like. How to improve the structure of the mouse to achieve aforesaid multiple functions, it has become an urgent problem need to be resolved.

SUMMARY OF THE INVENTION

It is an object of the present invention to provide a mouse having switch function. The mouse includes a bottom casing, a printed circuit board with a controller fixed thereon mounted on the bottom casing, a roller unit assembled to the bottom casing, and a top casing coupled to the bottom casing. The bottom casing has a retainer plate at a front portion thereof and a backing plate in rear of the retainer plate. The retainer plate defines a location hole thereon and the backing plate defines a receiving recess thereon. The printed circuit board defines an opening in front of the controller penetrating a front side thereof and a slit positioned between the controller and the opening. The backing plate passes through the slit to lie in front of the controller while the retainer plate locates in front of the opening. The roller unit includes a roller bearing, a roller pivotally assembled to the roller bearing, and an encoder fixed to the roller bearing and associated with the roller. The roller bearing has a location post extended forward from a front side thereof to be inserted into the location hole of the retainer plate, and a contact post extended rearward from a rear side thereof to be received in the receiving recess of the backing plate, so as to movably activate the controller. The top casing defines a through hole thereon for allowing the roller to partially project out therefrom.

As described above, when a user stirs the roller to move forward or rearward, the roller is capable of being adjusted to a front position of the through hole to make the contact post apart from the controller or adjusted to a rear position of the through hole to make the contact post rearward touch and activate the controller, so that the mouse of the present invention is capable of switching into different transmission modes.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
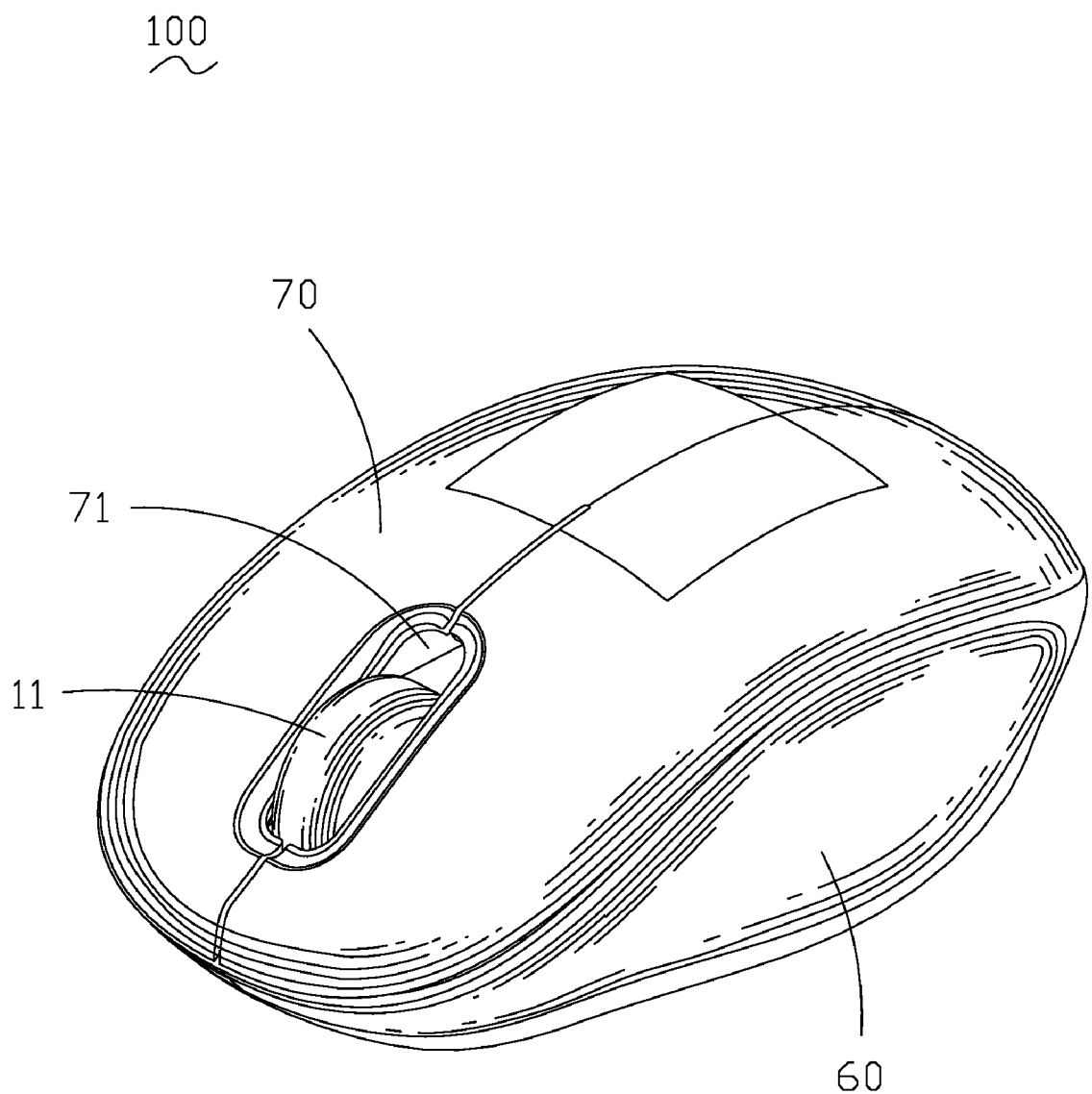
FIG. 1 is a perspective view of a mouse in accordance with the present invention.
Figure 4:
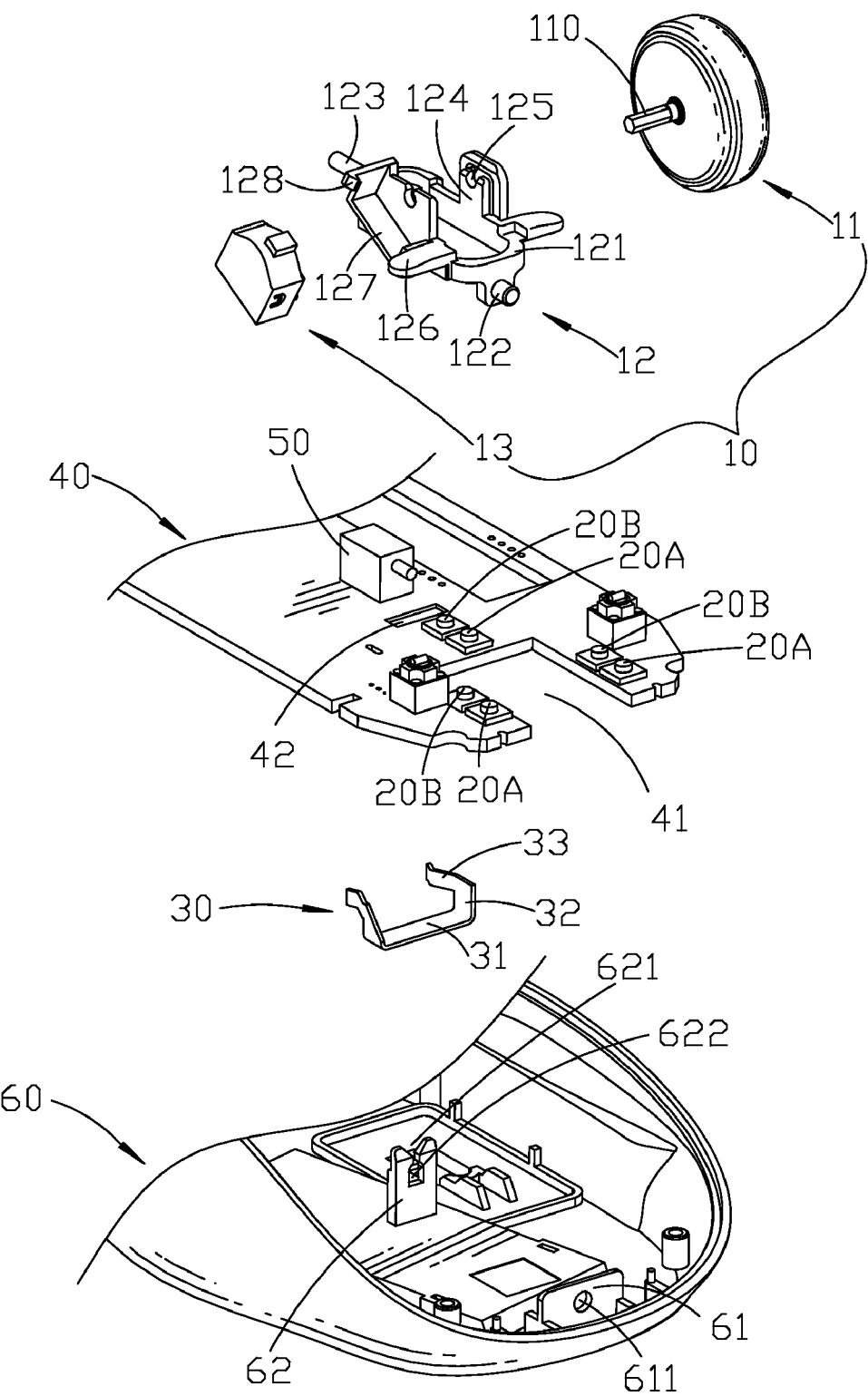
FIG. 4 is an exploded view of FIG. 2.

With reference to FIGS. 1 and 4, a mouse 100 according to the present invention has a mouse housing which includes a bottom casing 60 and a top casing 70 coupled with the bottom casing 60 to receive a roller unit 10, a printed circuit board (PCB) 40 with a controller 50 fixed thereon, and a latch element 30 therebetween.

Figure 5:
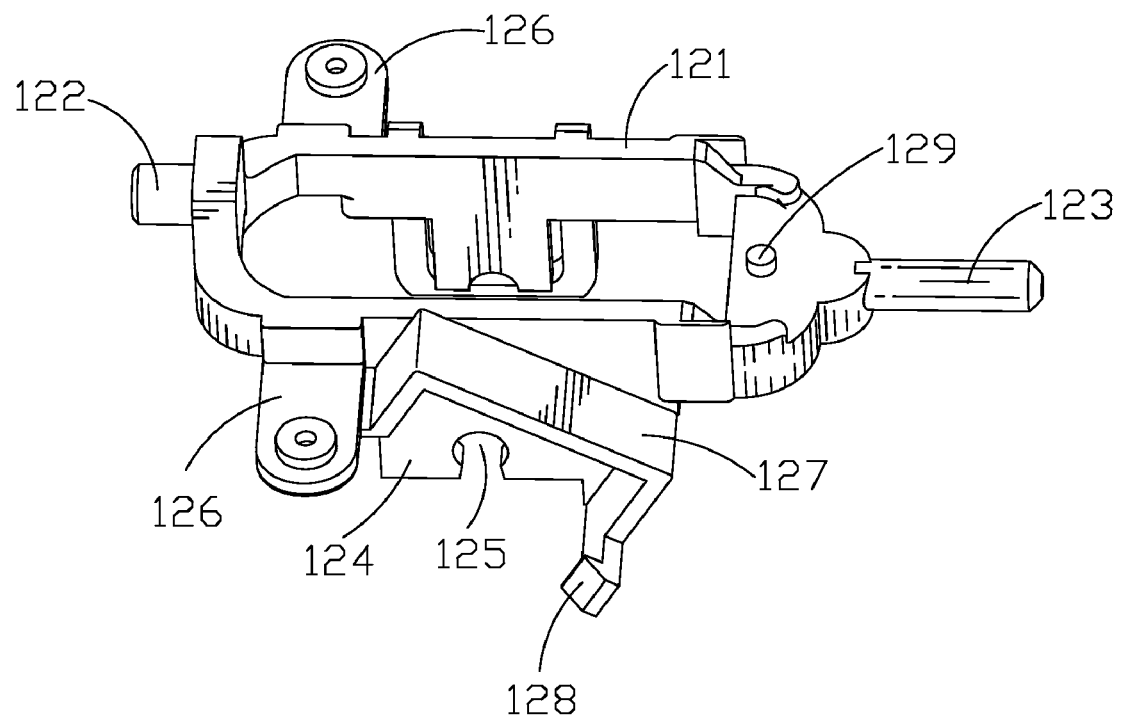
FIG. 5 is a perspective view of a roller bearing of the mouse.

As illustrated in FIG. 4, the roller unit 10 includes a roller 11, a roller bearing 12 and an encoder 13. The roller bearing 12 has a substantially rectangular frame 121 whose front side and rear side respectively extend forward and rearward to form a location post 122 and a contact post 123 longer than the location post 122. A pair of support plates 124 extends upwardly from middle portions of two opposite lateral sides of the frame 121 and each defines a pivot hole 125 at a top end thereof. A pair of press wings 126 extends outwardly from front portions of the two opposite lateral sides of the frame 121 to be located in front of the support plates 124. A recessed part 127 which has a lock portion 128 at a rear thereof is provided at an outside of one support plate 124. The roller bearing 12 further forms a projection 129 (see FIG. 5) protruded from a bottom portion of the rear side of the frame 121.

In assembly of the roller unit 10, the roller 11 is pivotally assembled to the roller bearing 12 by means of an axle 110, which penetrates the axis of the roller 11, engaging with the pivot holes 125. Then the encoder 13 is received and fixed to the recessed part 127 by the lock portion 128 so as to associate with the axle 110. If a finger is rolled over the roller 11, the encoder 13 can sense and transform the rotation of the roller 11 into an upward or downward movement of a file or document or web page on a display screen.

The PCB 40 defines an opening 41 in front of the controller 50 penetrating a front side thereof to form two opposite side edges and a rear edge connected with the two side edges. A slit 42 is defined at the PCB 40 and positioned between the opening 41 and the controller 50. The PCB 40 also provides six switches 20 which are divided into three groups located near the three edges of the opening 41, respectively. Furthermore, one group is located between the opening 41 and the slit 42. Each of the groups includes two switches 20 arranged longitudinally to be further defined as front switch 20A and rear switch 20B for convenience.

The latch element 30 has a flat-plate base portion 31, a pair of sidewalls 32 extended upwardly from both ends of the base portion 31 and a pair of elastic arms 33 extended rearward from upper portions of the pair of sidewalls 32 with free ends thereof protruded towards each other. The bottom casing 60 has a retainer plate 61 at a front portion thereof and a backing plate 62 disposed in rear of the retainer plate 61. The retainer plate 61 defines a location hole 611 thereon. The backing plate 62 defines a substantially V-shaped guiding slot 621 at a top portion thereof and a receiving recess 622 communicated with a bottom of the guiding slot 621.

Figure 2:
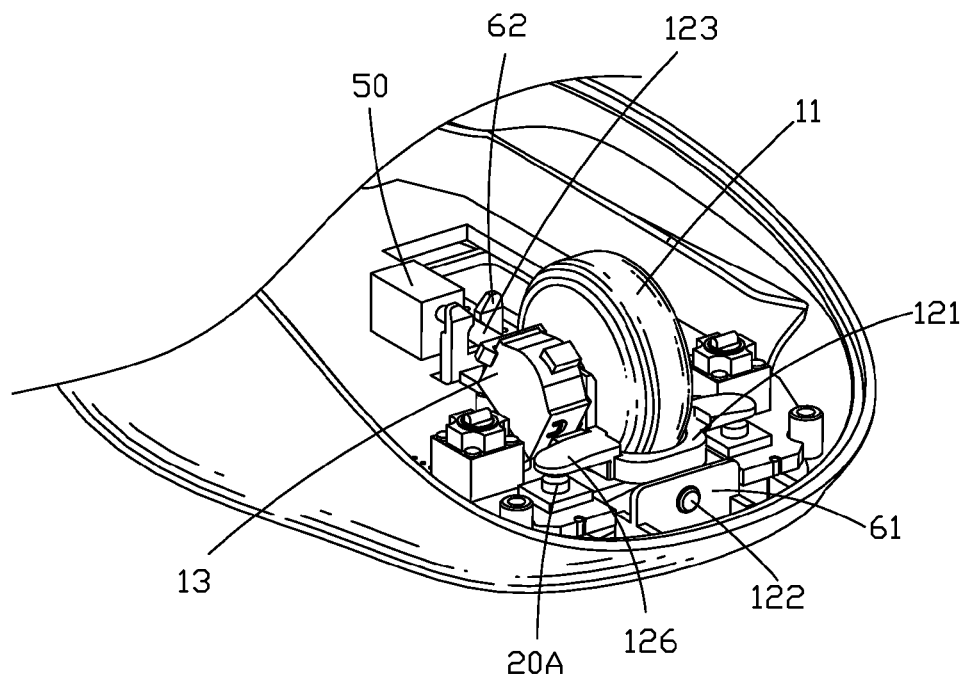
FIG. 2 is a partial perspective view of the mouse shown in FIG. 1 without top casing.
Figure 3:
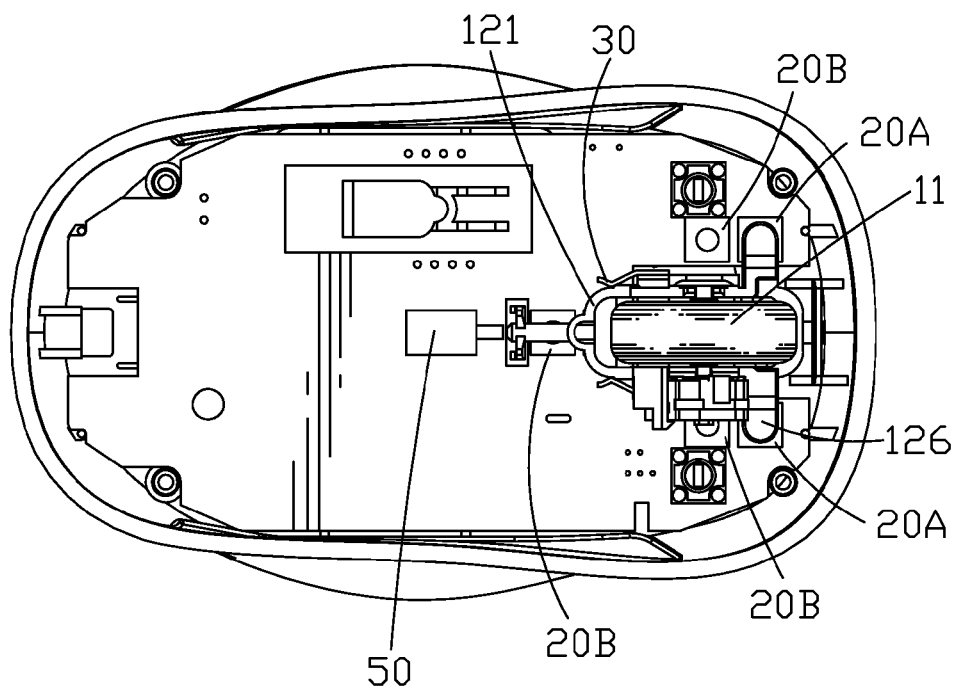
FIG. 3 is a top plan view of FIG. 2.

Referring to FIGS. 2 to 4, in assembly of the mouse 100, the PCB 40 is firstly assembled to the bottom casing 60 with the backing plate 62 passing through the slit 42 to lie in front of the controller 50 while the retainer plate 61 located in front of the opening 41. Then the latch element 30 is received in the opening 41 with the sidewalls 32 against the rear edge of the opening 41. Next, the roller unit 10 is installed to the bottom casing 60. The location post 122 of the roller bearing 12 is inserted into the location hole 611, the contact post 123 slides into the receiving recess 622 along the guiding slot 621 so as to face the controller 50. In this case, the two elastic arms 33 of the latch element 30 are respectively against the two opposite lateral sides of the frame 121, as best shown in FIG. 3. And meanwhile, the press wings 126 and the projection 129 are respectively positioned over the corresponding switches 20. Finally, the top casing 70 is coupled to the bottom casing 60 to enclose the roller unit 10, the PCB 40 and the latch element 30. The roller 11 partially projects out the top casing 70 from a through hole 71 (shown in FIG. 1) so that a user can operate it.

Referring to FIG. 1 and FIG. 3, in use, the mouse 100 works at a first transmission mode when the roller 11 is located at a front position of the through hole 71. In this case, the press wings 126 and the projection 129 are respectively positioned over the corresponding front switches 20A and the contact post 123 does not touch the controller 50. If a user stirs the roller 11 from the front position to a rear position of the through hole 71, the contact post 123 is brought to move rearward to touch and activate the controller 50, then the controller 50 switches the mouse 100 to work at a second transmission mode different from the first transmission mode. Accordingly, the press wings 126 and the projection 129 are moved to position over the corresponding rear switches 20B. So the mouse 100 is capable of working at the first transmission mode when the user stirs the roller 11 to move forward at the front position of the through hole 71, and working at the second transmission mode when the user stirs the roller 11 to move rearward at the rear position of the through hole 71. That is to say, the mouse 100 can switch into different transmission modes by stirring the roller 11 to move forward or rearward.

When the mouse 100 works at the first transmission mode, if the user presses down the roller 11, the projection 129 will press against and activate the corresponding front switch 20A located between the slit 42 and the opening 41 to perform a middle click action. If the user stirs the roller 11 to tilt leftwards or rightwards, the left or right press wing 126 will press against and activate the corresponding front switch 20A located near the corresponding side edge of the opening 41 to perform a leftward or rightward movement of a file or document or web page on display screen. Because the front switches 20A and the rear switches 20B are the same, the mouse 100 can realize the same key functions as well as the first transmission mode when it works at the second transmission mode.

As described above, when the user stirs the roller 11 to move forward or rearward, the roller 11 is capable of being adjusted to the front position of the through hole 71 to make the contact post 123 apart from the controller 50 or adjusted to the rear position of the through hole 71 to make the contact post 123 rearward touch and activate the controller 50, so that the mouse 100 of the present invention is capable of switching into different transmission modes. In addition, no matter the mouse 100 works at the first or second transmission mode, the mouse 100 can realize the same key functions.

What is claimed is:

1. A mouse, comprising:
a bottom casing, the bottom casing having a retainer plate at a front portion thereof and a backing plate in rear of the retainer plate, the retainer plate defining a location hole thereon, the backing plate defining a receiving recess thereon;
a printed circuit board with a controller fixed thereon mounted on the bottom casing, the printed circuit board defining an opening in front of the controller penetrating a front side thereof and a slit positioned between the controller and the opening, the backing plate passing through the slit to lie in front of the controller, the retainer plate located in front of the opening;
a roller unit assembled to the bottom casing, the roller unit including a roller bearing, a roller pivotally assembled to the roller bearing, and an encoder fixed to the roller bearing and associated with the roller, the roller bearing having a location post extended forward from a front side thereof to be inserted into the location hole of the retainer plate, and a contact post extended rearward from a rear side thereof to be received in the receiving recess of the backing plate, so as to movably activate the controller; and
a top casing coupled with the bottom casing, the top casing defining a through hole thereon for allowing the roller to partially project out therefrom;
wherein the roller is capable of being adjusted to a front position of the through hole to make the contact post apart from the controller or adjusted to a rear position of the through hole to make the contact post rearward touch and activate the controller;
wherein the roller bearing has a substantially rectangular frame, the location post and the contact post respectively extend from a front side and a rear side of the frame, a pair of support plates extends upwardly from two opposite lateral sides of the frame and each defines a pivot hole thereon, the roller has an axle pivotally engage with the pivot holes of the support plates.

2. The mouse as claimed in claim 1, wherein the backing plate defines a substantially V-shaped guiding slot at a top portion thereof and communicated with the receiving recess for guiding the contact post to slide into the receiving recess.

3. The mouse as claimed in claim 1, wherein the roller bearing provides a recessed part at an outside of one support plate to receive the encoder.

4. The mouse as claimed in claim 1, further comprising a latch member located at the opening of the printed circuit board, the latch member has a pair of elastic arms respectively against two opposite lateral sides of the roller bearing.

5. The mouse as claimed in claim 4, wherein the latch member has a flat-plate base portion and a pair of sidewalls extended upwardly from both ends of the base portion to be against a rear edge of the opening, the pair of elastic arms extends rearward from the pair of sidewalls with free ends thereof protruded towards each other.

6. The mouse as claimed in claim 1, wherein the roller bearing has a pair of press wings extends outwardly from two opposite lateral sides thereof and a projection protruded from a bottom of a rear thereof, the printed circuit board has three front switches and three rear switches located at two opposite edges and a rear edge of the opening, respectively, corresponding to the press wings and the projection.

* * * * *